United States Patent [19]

Psaar

[11] 4,083,680
[45] Apr. 11, 1978

[54] PRINTING INKS FOR TRANSFER PRINTING

[75] Inventor: Hubertus Psaar, Leverkusen, Germany

[73] Assignee: Bayer Aktiengesellschaft, Leverkusen, Germany

[21] Appl. No.: 658,470

[22] Filed: Feb. 17, 1976

Related U.S. Application Data

[63] Continuation of Ser. No. 468,934, May 10, 1974, abandoned.

[30] Foreign Application Priority Data

Apr. 18, 1973 Germany .................. 2325155

[51] Int. Cl.² .................................. D06P 3/00
[52] U.S. Cl. ........................ 8/2.5 A; 8/41 R;
8/82; 8/168 AA; 8/168 B; 8/168 CA; 8/168 R; 106/22
[58] Field of Search ........... 8/2.5, 168, 2.5 R, 2.5 A, 8/41 A, 41 R, 168 R, 168 B, 168 CA, 168 AA, 82

[56] References Cited

U.S. PATENT DOCUMENTS

| | | | |
|---|---|---|---|
| 3,995,992 | 12/1976 | DeFago et al. | 8/2.5 R |
| 4,040,779 | 8/1977 | Loew et al. | 8/2.5 R |

FOREIGN PATENT DOCUMENTS

| | | |
|---|---|---|
| 570,686 | 8/1958 | Belgium. |
| 1,205,638 | 4/1960 | Germany. |
| 769,163 | 2/1957 | United Kingdom. |
| 951,987 | 3/1964 | United Kingdom. |

OTHER PUBLICATIONS

Abbadi et al., J. Organic Chem. (USSR), Nov. 1972, vol. 8, (No. 11), pp. 2409–2411, (2456-2457).

*Primary Examiner*—A. Lionel Clingman
*Attorney, Agent, or Firm*—Plumley and Tyner

[57] ABSTRACT

Printing inks for the preparation of temporary supports for transfer printing on acid-modified textile fibre materials, containing (a) as a dyestuff intermediate a dyestuff base which can be sublimed at 160°–240° C, of the formula

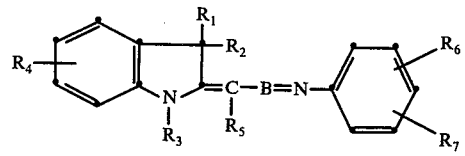

wherein
$R_1$ and $R_2$ are alkyl,
$R_3$ is hydrogen, alkyl, cycloalkyl or aralkyl,
$R_4$ is hydrogen or a non-ionic substituent,
$R_5$ is hydrogen, an alkyl, alkoxycarbonyl or nitrile group,
$R_6$ and $R_7$ are hydrogen or non-ionic substituents,
B represents —CH—, —N═ or

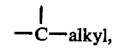

(b) a organic solvent and
(c) a neutral resin.

2 Claims, No Drawings

PRINTING INKS FOR TRANSFER PRINTING

This is a Continuation of application, Ser. No. 468,934, filed May 10, 1974, now abandoned.

The invention relates to new printing inks for the preparation of temporary supports for transfer printing on acid-modified textile fibre materials.

These inks are characterised in that they contain at least (a) a dyestuff base which can be sublimed at 160°–240° C, of the formula

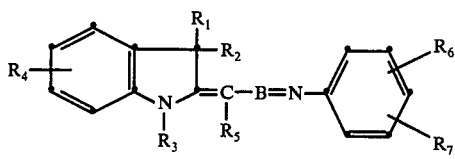

wherein
- $R_1$ and $R_2$ represent an alkyl radical or conjointly with the C atom by which they are linked form a carbocyclic ring,
- $R_3$ denotes hydrogen or an alkyl, cycloalkyl or aralkyl radical,
- $R_4$ denotes hydrogen or a non-ionic substituent,
- $R_5$ denotes hydrogen or an alkyl, alkoxycarbonyl or nitrile group,
- $R_6$ and $R_7$ denote hydrogen or identical or different non-ionic substituents which can optionally conjointly form a heterocyclic structure and
- B represents —CH—, —N= or

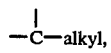

(b) a practically anhydrous neutral organic solvent and (c) a neutral resin which is soluble in this solvent.

By "transfer printing" there is understood a recent dyeing or printing process which is characterised in that the dyestuffs are transferred by the action of heat and optionally of pressure from a temporary support printed with special printing inks onto the substrate which is to be printed, that is to say, in general, that they sublime from the temporary support onto the substrate (compare, for example, French Patent Nos. 1,223,330 and 1,334,829). Hitherto, readily sublimable disperse dyestuffs have as a rule been employed as dyestuffs for this purpose, whilst polyester fibre materials have preferably been employed as substrates.

The dyestuffs used in the inks according to the invention are, on the other hand, preferentially suitable for printing of textile fibre materials which can be dyed with basic dyestuffs.

The temporary supports are, as in the customary transfer process, preferably paper, but also cellophane, cellulose textiles, metal foils and the like.

In the dyestuffs of the formula I required for the new printing inks, the alkyl radicals $R_1$, $R_2$ and $R_5$ above all represent alkyl radicals with 1 to 4 C atoms, methyl being preferred.

Suitable alkyl radicals $R_3$ are $C_1$-$C_4$-alkyl radicals which are optionally substituted by OH, halogen, nitrile, $C_1$-$C_2$-alkoxy or $C_2$-$C_4$-alkoxycarbonyl, such as methyl, ethyl, n-propyl, n-butyl, hydroxyethyl, chloroethyl, cyanoethyl, methoxyethyl and ethoxyethyl, acetoxyethyl and others.

Suitable carbocyclic rings formed by $R_1$ and $R_2$ are cyclopentyl and cyclohexyl rings.

Suitable cycloalkyl radicals $R_3$ are cyclopentyl and cyclohexyl radicals.

Suitable aralkyl radicals $R_3$ are benzyl and phenylethyl radicals.

Suitable alkoxycarbonyl radicals $R_5$ are methoxycarbonyl and ethoxycarbonyl radicals.

Suitable non-ionic substituents $R_4$, $R_6$ and $R_7$ are non-dissociating substituents customary in dyestuff chemistry.

Preferred radicals $R_4$ are alkyl, cycloalkyl, aryl, aralkyl, alkoxy, aryloxy, aralkoxy, alkylamino, dialkylamino, arylamino, aralkylamino, acylamino, sulphonamido, carbonamido, alkoxycarbonyl, acyl, nitrile and halogen.

Preferred radicals $R_5$ and $R_6$ are alkyl, alkoxy, aralkoxy, acylamino, dialkylamino or alkylmercapto.

The alkyl and alkoxy radicals mentioned above in any particular context (thus, for example, also including alkylmercapto and alkoxycarbonyl) are above all those with 1 to 4 C atoms.

By "acyl" there is to be understood $C_1$-$C_4$-alkylcarbonyl, arylcarbonyl and in the case of $R_4$ also arylsulphonyl.

The aryl radicals mentioned in any particular context are above all to be understood as phenyl and tolyl radicals. The preferred cycloalkyl and aralkyl radicals have already been mentioned for $R_3$.

Halogen is preferably F, Cl and Br.

Dyestuff bases to be used preferentially are those of the formula I
wherein
- $R_1$, $R_2$ and $R_3$ denote methyl,
- $R_4$ denotes H, methyl, methoxy or chlorine,
- $R_5$ denotes H or methyl and
- $R_6$ and $R_7$ denote H, methyl, methoxy, ethoxy, methylmercapto, dimethylamino, diethylamino or acetyl, or conjointly form a thiazole or dioxane radical. Very particularly preferred dyestuff bases are those in which
- $R_6$ " H and
- $R_7$ denotes methoxy, ethoxy or acetyl and is in the p-position to the N atom.

The dyestuff bases to be used according to the invention are in many cases known and are described, for example, in the following journals: Berichte, 57, 144 (1924) and 59, 2,413 (1926); J. org. Chem. (USSR) VIII, 2,409 (1972) and, as intermediate products, in the following patent literature: German Patent Nos. 1,004,748, 1,205,638, 1,083,000, 1,050,475 and 1,050,476. Other suitable dyestuff bases of the formula I can be prepared analogously.

The dyestuff intermediates to be used according to the invention can be employed either in a pure, undiluted, pulverulent form (so-called uncut ware), or in the form of preparations. A suitable method for producing such preparations is especially that described in German Offenlegungsschrift (German Published Specification) 1,469,724, in which the dyestuff is kneaded with a resin which does not soften below 120° C, a non-ionic dispersing agent and optionally an antioxidant and the resulting granules are ground.

In general, the dyestuff is present in the printing inks according to the invention in the form of a solution.

Suitable solvents are neutral solvents, that is to say solvents which do not react chemically with the dyestuff intermediates, namely: hydrocarbons, such as benzene, toluene and xylene; chlorinated hydrocarbons, such as chlorobenzene, ethylene chloride, trichloroethylene and tetrachloroethylene; alcohols, such as methanol, ethanol, isopropanol, butanol and benzyl alcohol; ketones, such as methyl ethyl ketone and cyclohexanone, and various ethers and esters. They are used in the pure form or as mixtures. Preferred solvents are the hydrocarbons mentioned, and amongst these toluene is again preferred.

To prepare the new printing inks it is in principle possible to employ, as resins, the same types as are used in the preparation of transfer printing inks based on disperse dyestuffs, provided the resins have a neutral reaction, because of the sensitivity to acids and alkalis of the dyestuffs to be used according to the invention. Suitable resins are, for example, ketone resins, such as, say, Kunstharz AFS(R), and cellulose ethers, such as, say, ethylcellulose.

To improve the sharpness of the contours of the prints produced according to the invention it is possible, if desired, to coat the temporary supports, printed with the new printing inks, with a colourless layer of binder or resin, in accordance with the instructions of German Offenlegungsschrift (German Published Specification) 2,110,910.

Suitable substrates which take up the dyestuff during the transfer printing process are — as already mentioned — usual materials which can be dyed with basic dyestuffs, for example materials of polyacrylonitrile, of copolymers of acrylonitrile with other vinyl compounds, such as vinyl chloride, vinylidene chloride, vinyl fluoride, vinyl acetate, vinylpyridine, vinylimidazole, vinyl alcohol, acrylic and methacrylic acid esters and amides and asymmetrical dicyanoethylene, and of acid-modified synthetic materials, especially of acid-modified aromatic polyesters and acid-modified polyamide fibres. Acid-modified aromatic polyesters are, for example, polycondensation products of sulphoterephthalic acid and ethylene glycol, that is to say polyethylene glycol terephthalates containing sulphonic acid groups (type DACRON 64 of E. I. DuPont de Nemours and Company), as are described in Belgian Patent No. 549,179 and U.S. Pat. No. 2,893,816.

The dyestuff transfer takes place at temperatures of 160°–240° C, preferably 200°–220° C, for 15–60 seconds.

The heat transfer can be effected by direct contact with heating plates, by hot air, by hot steam or by infrared radiation. The dyeings and prints obtained on the materials used as substrates display good fastness properties in use.

EXAMPLE 1

20 g of a compound of the formula

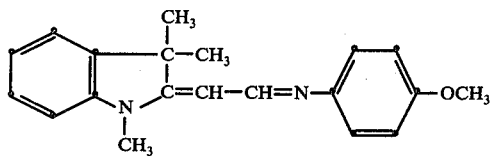

are ground in a pearl mill with 0–7.5 g of a cyclohexanoneformaldehyde resin of softening point above 160° C and 10–2.5 g of ethylcellulose N₄. 100 parts of a printing ink are prepared by addition of toluene which contains 10% of polywaxes. A paper is impregnated with this printing ink, using a spray gun. If this paper is pressed against a textile of polyacrylonitrile fibres for 15–30 seconds at 180° C, a yellow print with good fastness properties is obtained. If a textile of acid-modified polyester fibres (Dacron 64) is used, a strong yellow dyeing is again obtained.

EXAMPLE 2

20 g of the compound of the formula

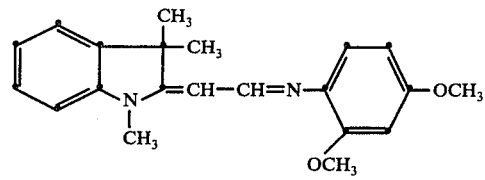

are ground in a pearl mill with 0–7.5 g of a cyclohexanoneformaldehyde resin of softening point above 160° C and 10–2.5 g of ethylcellulose N₄. 100 parts of a printing ink are prepared by addition of toluene which contains 10% of polywaxes. A paper is impregnated with this printing ink, using a spray gun. If this paper is pressed against a textile of polyacrylonitrile fibres for 15–30 seconds at 180° C, a yellow print with good fastness properties is obtained. If a textile of acid-modified polyester fibres (Dacron 64) is used, a strong yellow dyeing is again obtained.

EXAMPLE 3

20 g of the compound of the formula

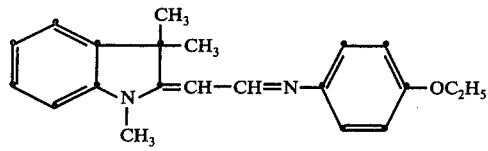

are dissolved in 800 g of toluene which contains 10% of polywaxes. A paper is impregnated with this solution and dried. If this paper is pressed against a fabric of polyacrylonitrile fibres a yellow dyeing with good fastness properties is obtained.

EXAMPLE 4

20 g of the compound of the formula

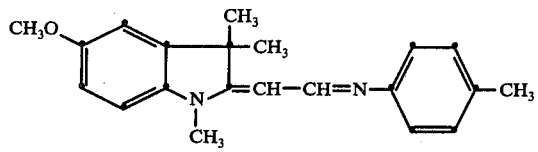

are converted to a printing ink as in Example 2. An aluminium foil is impregnated with this printing ink by means of a spray gun. If this foil is pressed against a fabric of polyacrylonitrile fibres for 15–40 seconds at 180° C, a clear yellow print is obtained. If a textile of acid-modified polyamide is used, a yellow print is again obtained.

If instead of the dyestuff intermediates employed in Examples 1–4 the carbinol bases indicated by formulae in the table which follows are used to prepare printing inks, the temporary supports printed therewith give transfer prints on acid-modified textile fibre materials, for example polyacrylonitrile materials, which have the colour shades indicated in the last column of the table which follows.

1. In a process for transfer printing of acid-modified textile fiber materials wherein a dyestuff is applied to a temporary carrier web and subsequently transferred to the textile material by being pressed against the textile

| Example | Formula | Colour shade |
|---|---|---|
| 5 | | yellow |
| 6 | | yellow |
| 7 | | yellow |
| 8 | | yellow |
| 9 | | yellow |
| 10 | | yellow |
| 11 | | orange |
| 12 | | red |
| 13 | | yellow |

I claim:

and heated to cause the dyestuff to sublime and be adsorbed by the textile material, the improvement which comprises employing a printing ink consisting essentially of (a) as a dyestuff intermediate a dyestuff base which can be sublimed at 160°–240° C, of the formula

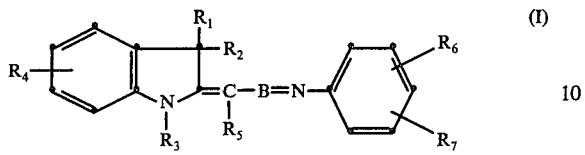 (I)

wherein $R_1$ and $R_2$ represent an alkyl or conjointly with the C atom by which they are linked form a carbocyclic ring;

$R_3$ denotes hydrogen alkyl, cycloalkyl or aralkyl;

$R_4$ denotes hydrogen, alkyl, cycloalkyl, aryl, aryl, aralkyl, alkoxy, aryloxy, aralkoxy, alkylamino, dialkylamino, arylamino, aralkylamino, acylamino, sulphonamido, carbonamido, alkoxycarbonyl, acyl, nitrile or halogen;

$R_5$ denotes hydrogen, alkyl, alkoxycarbonyl, or nitrile;

$R_6$ and $R_7$ denote hydrogen, alkyl, alkoxy, aralkoxy, acylamino, dialkylamino or alkylmercapto; or $R_6$ and $R_7$ conjointly form a heterocyclic structure; and B represents CH, N, or C-alkyl;

(b) a practically anhydrous neutral organic solvent; and (c) a neutral resin which is soluble in this solvent.

2. Process of claim 1 wherein $R_1$, $R_2$ and $R_3$ denote methyl, $R_4$ denotes H, methyl, methoxy or chlorine, $R_5$ denotes H or methyl and $R_6$ and $R_7$ denote H, methyl, methoxy, ethoxy, methylmercapto, dimethylamino, diethylamino or acetyl or conjointly form a thiazole or dioxane radical.

* * * * *